United States Patent [19]

Kurosaki et al.

[11] 4,326,869
[45] Apr. 27, 1982

[54] METHOD OF PRODUCING OPTICAL WAVEGUIDE

[75] Inventors: Shiro Kurosaki; Minoru Watanabe; Yuichi Usui, all of Yokohama, Japan

[73] Assignee: Sumitomo Electric Industries, Ltd., Osaka, Japan

[21] Appl. No.: 80,159

[22] Filed: Sep. 28, 1979

[30] Foreign Application Priority Data

Sep. 28, 1978 [JP] Japan .................. 53-120176

[51] Int. Cl.³ ............................................ C03C 25/02
[52] U.S. Cl. ...................................... 65/3.14; 65/3.15; 65/13; 65/31
[58] Field of Search ................ 65/3 A, 13, 30 R, 31; 65/3.2, 3.11, 3.12, 3.14, 3.15

[56] References Cited

U.S. PATENT DOCUMENTS

| | | | |
|---|---|---|---|
| 3,938,974 | 2/1976 | Macedo et al. | 65/3 A |
| 4,078,910 | 3/1978 | Dalgoutte | 65/3.2 |
| 4,110,093 | 8/1978 | Macedo et al. | 65/30 R |
| 4,110,096 | 8/1978 | Macedo et al. | 65/30 R |
| 4,165,222 | 8/1979 | Panafieu et al. | 65/30 R |

FOREIGN PATENT DOCUMENTS 51-56642  5/1976  Japan .................. 65/3 A

Primary Examiner—Robert L. Lindsay, Jr.

[57] ABSTRACT

A method for producing an optical waveguide by melt-drawing a transparent glass rod which has been produced by collapsing a porous glass rod after being doped with a dopant material by depositing said material on the surface of the micro pores in order to enhance the refractive index of the collapsed glass rod, wherein a waveguide having higher mechanical strength and lower transmission is attained by drawing said glass rod at a temperature very close to the melting point of the outermost portion of the fiber without causing any overmelting or bubbling in the core portion, said drawing being facilitates by matching the viscosity and characteristics of the outermost lower-refractive-index portion to those of the central higher-refractive-index portion.

5 Claims, 9 Drawing Figures

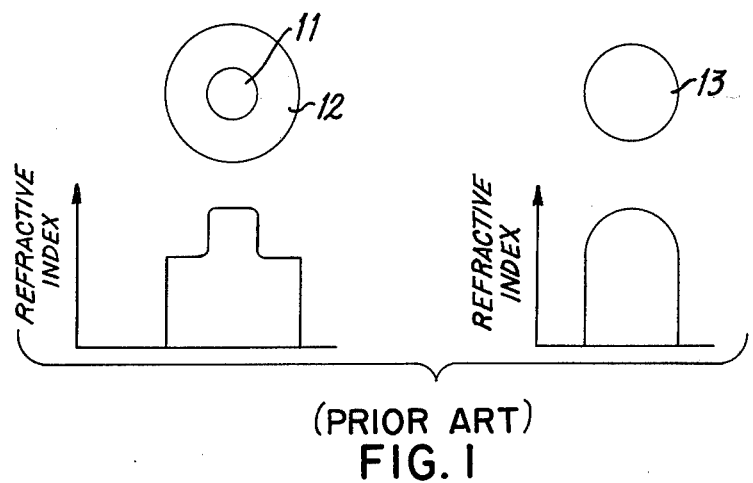
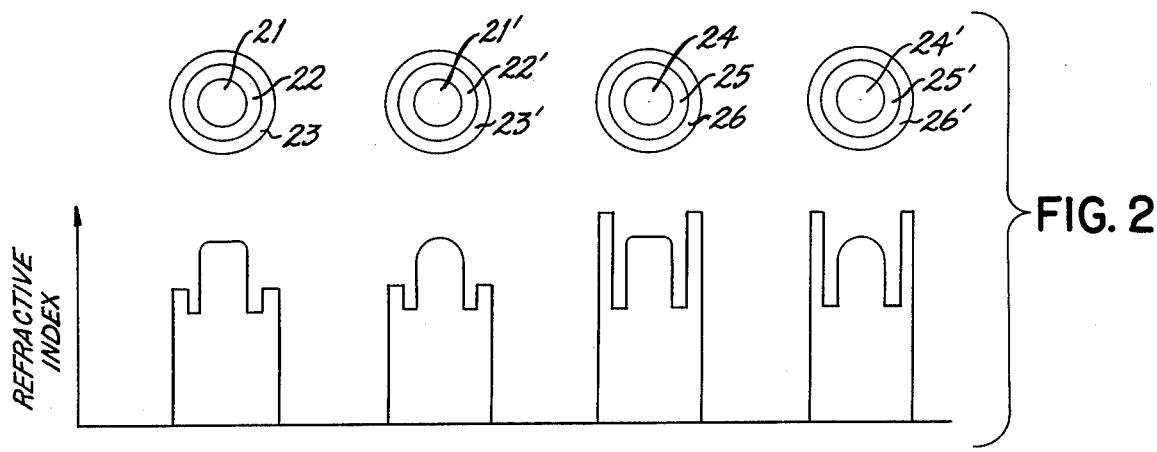
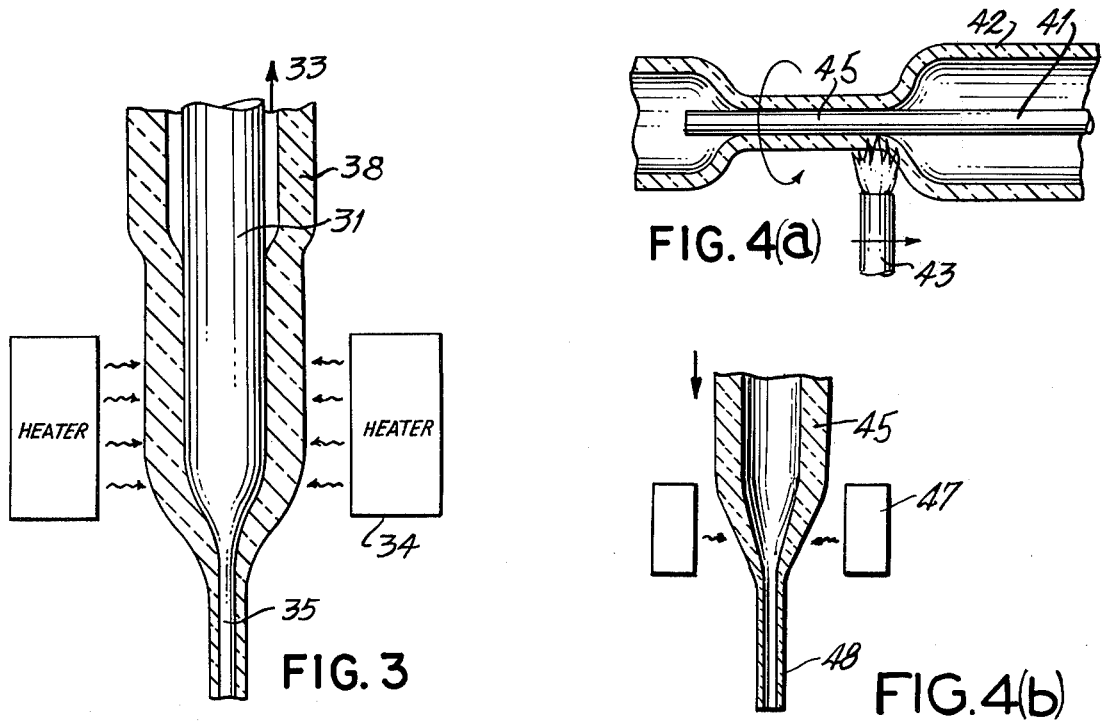
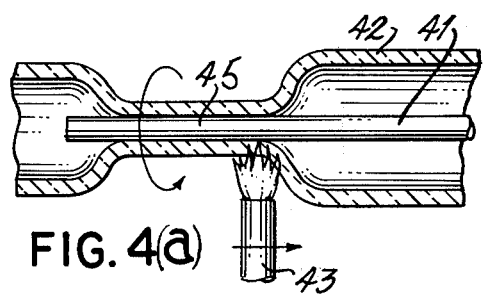
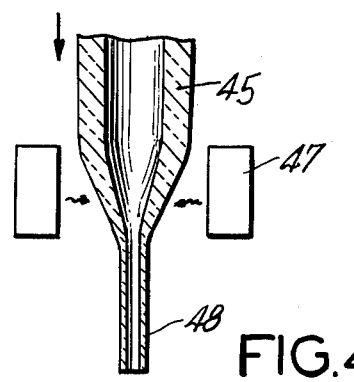

METHOD OF PRODUCING OPTICAL WAVEGUIDE

A lower transmission loss of light, a proper refractive-index distribution over the cross section of the fiber and higher mechanical strength are qualities desired of optical waveguides. A number of manufacturing processes for such waveguides have been proposed; e.g. the, CVD chemical vapor deposition process and improved CVD process for producing silicate-type glass waveguides and, the double-crucible process for producing a multi-component glass waveguide. Also the M-CVD process, O-CVD process and VAD processes are well known methods for producing preforms, a starting material for forming a glass fiber. Apart from these, a method called the molecular stuffing process has been proposed as a more advanced method by which mass production of economical preforms are possible.

The present invention relates to an improvement of the manufacturing process in which the use of the abovementioned molecular stuffing method is used.

Detailed information concerning the molecular stuffing process may be found in Japanese Patent publications Nos. 50-28339, 51-135915 (U.S. Pat. No. 4,110,096), 51-126207 (U.S. Pat. No. 4,110,093) and 53-102324. In such processes, a porous glass rod, which consists of $SiO_2$ and a small percentage of of $B_2O_3$ produced by phase-separation, is used as the starting material. The above patents only refer to porous glass made by phase-separation; however, the same methods are also applicable to porous glasses produced by partially-sintering CVD glass powders or by partially-sintering fine glass fibers.

In the prior art such as is disclosed in Japanese Patent publication No. 51-216,207 (U.S. Pat. No. 4,110,093), a porous silicate glass including a small amount of $B_2O_3$ is doped with a dopant material in a way that the dopant distribution produces a desired refractive-index distribution in the porous glass rod. In order to stuff said dopant into the rod in a desired manner; the porous glass is immersed in a solution containing a compound which is later converted into the dopant, and the special distribution of the dopant to be deposited on the surface of the micro pores is controlled by adjusting the solubility of the compound, temperature and the kind of solvent used. The method is described in detail as follows.

The porous glass rod is immersed in an aqueous solution of a compound which will later be converted to an oxide dopant to enhance the refractive index of the glass (The solution is herein referred to as "stuffing agent"). For example, an aqueous solution of $C_sNO_3$, which decomposes at high temperature to $Cs_2O$, is stuffed in the pores of the rod at 100° C., and the rod is then immersed in a colder liquid, e.g., water at 0°–4° C., in order to reduce the solubility of $C_sNO_3$, whereby an amount of $C_sNO_3$ which exceeds the solubility at the temperature is deposited on the interior wall on the surface of the micro pores. The glass rod is subsequently immersed in a fresh, comparatively poor solvent such as water, water-alcohol system or any other alcoholic solutions, so that the deposited material is gradually removed from the periphery of the rod by dissolution. The concentration gradient of the solute along the radius is controlled by varying the temperature of dissolution. If the temperature of the unstuffing agent is low enough, the radial distribution of the dopant will become sharp and abrupt due to the reduced diffusion rate.

A less sharp distribution will be obtained if the unstuffing process is carried out at higher temperature. Further the radial distribution of dopant (the sum of $C_sNO_3$ deposited on the surface of the micro pores and $C_sNO_3$ still dissolved in the solution) is easily controlled to generate, for example, a stepwise or parabolic distribution by properly choosing the sequence of temperatures of unstuffing. The glass rod having a proper radial distribution of $C_sNO_3$ (both deposited and dissolved) is then immersed in a fresh very poor solvent in order that $C_sNO_3$ remaining undissolved in the solution is deposited on the surface of the micro pores. The rod is then dried under vacuum and the solvent or water absorbed on the surface of the micro pores is subsequently removed by heating. As the temperature is raised further, the compound $C_sNO_3$ is decomposed to the dopant $Cs_2O$ according to the reaction; $2C_sNO_2 \rightarrow C_{s2}O + N_2O_5$. The rod is then heated still further in s suitable atmosphere until the pores collapse, and a transparent glass rod doped with $C_{s2}O$ in a desired radial distribution is obtained.

Finally, an optical waveguide is formed by melt-drawing the preform thus prepared until the cross-sectional area is reduced to the desired dimensions.

However, the conventional practices described above, have the following disadvantages:

(1) The dopant concentration cannot be brought to zero at the periphery of the preform; accordingly, a certain amount of dopant which mostly consists of alkali metal and alkaline earth metal remains in the outer portion, resulting in a preform having a refractive index ($\sim 1.460$) in the peripheral portion higher than in the portion of non-doped silicate glass containing a small amount of $B_2O_3$ ($\sim 1.458$).

(2) A refractive index at the periphery can exceed the refractive index of the cladding, because the compound once deposited on the surface of the micro pores dissolves through the outer surface of the rod during the unstuffing process. The dopant distribution thus obtained is always lower at the periphery than at the central portion of the rod as is shown in FIG. 1 where, (a) is a stepwise distribution with a core (11) and a cladding (12) and (b) is a graded distribution (13).

In other words, refractive index distributions such as are shown in FIG. 2 can never be obtained by conventional practice. Such fibres may be used as optical waveguides after being covered by plastic resin for reinforcing the mechanical strength of the fibre. In this case, however, if the refractive index of the plastic resin is smaller than the refractive indices of the portions (12) or (13), the light energy would travel along both the portions (11) and (12) or the whole part of (13) and would not be confined in the core; moreover, if the refractive index of plastic resin is larger than that of (12) or (13), the light energy leaks into the resin resulting in an unfavorable absorption loss and narrower band width.

(3) A portion of the clad layer (12) of the optical waveguide works only as a mechanical support and need not always be made of expensive low-loss material; hence a fiber structure with more inexpensive support portions cladding around low-loss portions would be more desirable. However, in the prior art porous-glass technique, it is impossible to produce very long fibers when the cross-sectional area of the fiber is smaller than a certain limit, in spite of the fact that the manufacturing of porous glass rods and developing the dopant distribution is practically easy with this technique.

(4) The fiber in accordance with the conventional practices cannot be melt-drawn at temperatures high enough to obtain high mechanical strength after being quenched, because the viscosity of core glass is lower than that of the surroundings at the drawing temperature due to the high concentration of dopant, and the core portion starts bubbling before the more viscous surrounding glass reaches high enough temperature for drawing.

(5) The viscosity and the coefficient of expansion of the high refractive-index portion and the low refractive-index portion differ so much that an elastic strain takes place between these portions resulting in a high transmission loss even when the melt-drawing is carried out at a proper temperature for drawing the high viscous portion.

SUMMARY OF THE INVENTION

The present invention relates to a method of producing optical waveguide by melt-drawing a transparent glass rod which has been produced by collapsing a porous glass rod which has been doped with a material by depositing said material on the surface of the micro pores in order for varying the refractive index of the collapsed glass, wherein the viscosities and the coefficients of expansion, at the drawing temperature of the central highly refractive portion and the surrounding less refractive portion are matched with each other. The present invention relates more particularly to a method of producing an optical waveguide wherein a rod is prepared which is provided with a core portion having a high refractive index and a cladding portion having low refractive index by means of a stuffing process and unstuffing process in which the dopant is, respectively, deposited on or removed from the surface of the micro pores of the glass, said rod being inserted into a borosilicate or alumina-silicate glass pipe which has a higher index of refraction than the cladding and a viscosity and the coefficient of expansion similar to those of the core portion, whereby the viscosity and the coefficient of expansion of the jacket portion made of said borosilicate or alumina-silicate glass are matched with those of the core portion, and finally the melt-drawing process of the combination of said rod and pipe is carried out at the melting point of the core and the jacket glasses.

At that temperature the jacket glass is so softened that the surface thereof is very smooth according to this invention a fiber of high strength is obtained because of the smoothness of the surface of the fiber and also a fiber of low transmission loss is obtained because the temperature of the melt-drawing is lower than the temperature which would be involved in the absence of said jacket glass.

BRIEF DESCRIPTION OF THE DRAWINGS

FIG. 1 is an illustration of the structure and the refractive index distribution of two examples of optical waveguides made by the conventional molecular-stuffing process, FIG. 2 is an illustration of the structure and the refractive index distribution of four examples of optical waveguides made in accordance with the present invention, FIG. 3 is a schematic illustration of the steps of drawing in accordance with the present invention, FIG. 4a is a schematic illustration of the steps of collapsing the pipe in case the rod-in-tube method is employed in the present invention, FIG. 4b is a schematic illustration of the steps of melt-drawing the preform.

DETAILED DESCRIPTION OF THE INVENTION

Figure 5A:
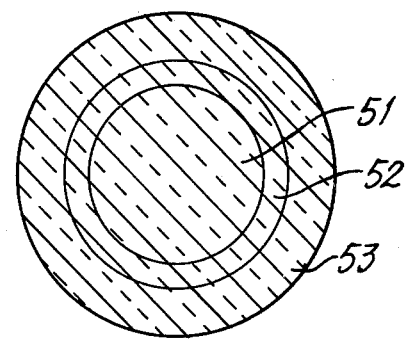
FIG. 5a is a cross-sectional view of the optical waveguide produced in accordance with the present invention.

One method for solving the above-mentioned problems of the conventional molecular-stuffing process is to provide at least one transparent and corrosion resistant layer at the exterior of the rod which has been doped with a suitable material in a desired distribution. However, the idea of providing a transparent jacket around a rod requires further consideration with respect to the physical properties of the glasses to be fused to each other.

The formation of optical waveguides involves a process of melt-drawing a preform having a core portion, a cladding portion and a jacket portion; the physical properties of the preform such as viscosity and coefficient of thermal expansion strongly influence this process. For example, the preform might suffer from cracks or bubbles during melt-drawing if there were great differences in the physical properties among the portions of the preform.

The present invention relates to a method of producing an optical fiber by melt-drawing a transparent glass rod which has been produced by collapsing a porous glass rod after being doped with a material by depositing said material on the surface of the micro pores in order to enhance the refractive index of the glass rod; the present invention makes it possible to draw the glass rods at a higher temperature very close to the melting point of the outermost glass layer without causing any over-melting while maintaining the viscosity of the outermost low refractive-index glass layer with those of the central high refractive-index glass thereby producing an optical waveguide having high mechanical strength and high durability against water and also low transmission loss characteristics.

The optical waveguide in accordance with the present invention has a refractive-index distribution shown in FIG. 2, i.e., the optical fiber has, at the exterior of the cores (21), (21'), (24), (24') and the claddings (22), (22'), (25), (25'), the jacket layers (23), (23'), (26), (26') a refractive index higher than the cladding layers.

The method of providing a preselected dopant distribution in a porous glass rod will be described, by way of example, with respect to a stuffing agent CS $NO_3$ and the dopant $CS_2O$. A rod of porous glass such as *Vycor*, which is a silicate glass including a small amount of $B_2O_3$, is immersed in a hot aqueous solution of $CSNO_3$ which will later be deposited in a form of a dopant $CS_2O$ on the surface of the micro pores.

The rod is subsequently immersed in pure cold water so that the solution in the pores saturates and the excess $CSNO_3$ deposits on the surface of the micro pores.

Since the concentration of the $CSNO_3$ on the surface of the glass rod is substantially zero, the $CSNO_3$ in the rod comes out of the pores by diffusion, and the dissolution of $CSNO_3$ once deposited on the surface of the micro pores starts first in the periphery and then in the inner portions. The solubility of this compound is 66.8 g. $CSNO_3$/100 g solution at 100° C. and 8.54 g $CSNO_3$/100 g solution at 0° C. The $CSNO_3$ distribution over the cross section of the rod thus obtained is higher at the central portions and lower at the peripheral portions. The glass rod is subsequently immersed in a poorer solvent such as methanol ($CH_3OH$) so that the residual solute still dissolved in the pores is further deposited. The rod is then dried in vacuo and heated slowly until the solute decomposes into $CSO_2$ by the reaction: $2CSNO_3 \rightarrow CS_2O + N_2O_5$. The rod heat-treated in this way has the predetermined distribution of dopant $CS_2O$ deposited on the pore walls, and as the temperature is raised still further, the viscosity of the glass drops low enough until the pores of the glass finally collapse and the porous rod becomes a transparent glass rod. The optical fiber drawn from this rod is shown in FIG. 1 in which (12) denotes the portion almost free from the dopant and (11) the portion still containing the dopant. The amount of dopant at portion (11) results from the difference in solubilities of CS $NO_3$ in the hot water and in the cold methanol, and the amount of dopant at portion (12) results from the difference in solubilities in the cold water and in the cold methanol. It is to be noted that the examples described above are only illustrative of the method and are not meant to limit the scope of the present invention.

Glass fiber obtained directly from such glass rods does not have sufficient long-term reliability, because of a slight amount of alkali remaining at the periphery; one of the practical solutions might seem to provide, at the exterior of the rod, a glass layer which does not contain any $CS_2O$. A silicate glass such as Vycor, for example, which contains $B_2O_3$ and is produced by collapsing undoped porous glass may be preferable for this purpose.

However, the index of refraction of this glass is as low as 1.458 which is lower than that of the cladding glass having a small amount of $CS_2O$ accordingly, the light wave to be transmitted along such optical waveguides travels through the core and the cladding portions, being reflected at the cladding-jacket interface; hence, the cladding portion acts as a part of the core and the jacket portion the cladding, resulting in a large transmission loss and narrower band width. Furthermore, the viscosity of this sort of glass is much higher than the viscosity of the core glass at high temperatures, and if the drawing temperature were chosen high enough to melt-draw the jacket glass, in order to obtain a fiber of high strength the viscosity of the core glass would drop so greatly that the core portion suffers from bubbling.

This phenomenon occurs not only when the preform having no jacket glass is melt drawn but also when the viscosity of the cladding glass is too much higher than the viscosity of the core glass.

The, the present applicants have found almina-silicate glass and borosilicate glass very suitable for use as the jacket glass. The refractive indices of these glasses are 1.53–1.55 for almina-silicate glass and 1.47 for borosilicate glass; both are higher than the index of the cladding glass (~1.460). Moreover, the fire-working temperatures of these glasses (which are 1150°–1200° C. for alumina-silicate glass and 1200°–1250° C. for borosilicate glass) are close to the fire-working temperature of $B_2O_3$ containing silicate glass doped with $CS_2O$ (1200°–1300° C.). This makes the assembling of preforms easier. Since these glasses are inexpensive and commercially available, the combination of glass materials disclosed in this invention facilitates inexpensive and easy production of optical waveguides.

A typical composition of borosilicate glass is $SiO_2$:81%, $B_2O_3$: 12.7%, $Al_2O_3$:2.3% and $Na_2O$ (+$K_2O$):4%, and a typical composition of alumina-silicate glass is; $SiO_2$:60%, $B_2O_5$:5%, $Na_2O$(+$K_2O$):1.1%, $Al_2O_3$:18.5%, MgO:7.9% and CaO:7.3%.

The FIGS. 3 and 4 show the process of inserting the glass rod into the pipe and melt-drawing the combination into fiber. Referring now to FIG. 3, a glass rod (31) doped with a suitable dopant is inserted into a glass pipe made of one of the aforementioned materials (such as pyrex glass) (38), and the rod and the pipe are sealed at one end by fusing to each other. The combination of the rod and pipe is then heated by heater (34) and drawn into a fiber 35 while evacuating the gap 33 between the rod and the pipe.

FIG. 4 shows another example in which a glass rod (41) doped with a suitable dopant and a glass pipe 42 made of one of the aforementioned glass materials is heated, while rotating, by an oxyhydrogen flame.

The pipe is then fused and collapsed to form a new single glass rod (45) as shown in FIG. 4(a). It may be necessary to cool the rod slowly enough to remove the thermal strain which might have been introduced during the assembling process. The rod is subsequently melt-drawn by heater 47 to a fiber 48 as shown in FIG. 4(b).

The method in accordance with the present invention has the following advantages:

(1) The mechanical strength and the long-term reliability are much improved since the pyrex or alumina-silicate glasses provided at the exterior of the fiber exhibit high durability against humidity and water. Particularly, the combination of glasses in accordance with the present invention provides fibers of high mechanical strength, because the melting point of the jacket glass is lower than that of the core glass and cladding glass and so when the preform consisting of these glasses is drawn the surface of the jacket glass becomes more soft and smooth than other glasses, and after cooling the solidity of the jacket glass imparts high strength to the fiber.

(2) A long fiber can be easily produced from a small glass rod doped with a suitable material.

(3) The fiber is inexpensive, because low-priced glass such as pyrex is used as a surrounding material.

(4) Because the index of refraction is greater in the outermost jacket than in the cladding and the transmission loss in the jacket portion is much higher than in the core/cladding, the light energy to be transmitted through the fiber is confined completely in the core and the higher modes are absorbed by the jacket glass so that the transmission loss and the signal distortion characteristics of the optical waveguide are maintained very low and stable while a wide band-width is retained.

(5) Structural imperfections of the optical waveguide which may cause a large transmission loss are avoided by drawing the $CSO-B_2O_3-SiO_2$ glass (high refractive-index glass) at a proper temperature. This is achieved by using low-melting-point glass as the external jacket glass.

PREFERRED EMBODIMENT

A glass having a composition of 3.5% $K_2O$, 3.5% $Na_2O$, 33% $B_2O_3$ and 60% $SiO_2$ is drawn into a rod of 10 mm of diameter at a temperature at which there is no phase separation. The rod is then heat-treated at 550° C. for 1.5 hours, leached in 3.0 N Hcl-aqueous solution at 95° C. for 48 hours and rinsed in pure water at 95° C. in order to provide pores in the glass rod. The porous-glass rod is, subsequently, stuffed in a $CSNO_3$ 100 g/$H_2O$ 100 g solution for 4 hours and then immersed in pure water at 0°–4° C. for 4 hours so that the solute further deposites on the surface of the micro pores and the unstuffing process takes place. The rod is subsequently immersed in acetic acid at 0°–4° C. for 4 hours for further deposition under the solute. The rod is dried up in the atmosphere of vacuum and then by heating. The rod is further heated until $CSNO_3$ is decomposed by the reaction; $2C_SNO_3 \rightarrow CS_2O + N_2O_5$.

The rod is held at 650° C. for a short time in an atmosphere of oxygen gas. And then further heated in an atmosphere of oxygen under a pressure of 60 mmHg until the pores of the glass collapse at 850° C. and the opaque porous glass turns to a transparent rod of 8 mm in diameter.

The glass rod is, subsequently, inserted in a pyrex pipe and melt-drawn at 1250° C. under an atmospheric pressure of 30 mmHg by the method shown in FIG. 3. One of the rods thus produced was melt-drawn, for comparison, without inserting into the pyrex pipe.

The preform having a pyrex jacket was found to produce longer and stronger fiber than the preform having no jacket portion; and the optical waveguide drawn from the former preform had a smaller absorption loss (18 dB/km for $\lambda = 0.85$ $\mu$m) than the waveguide drawn from the latter (30 dB/km).

Figure 5B:
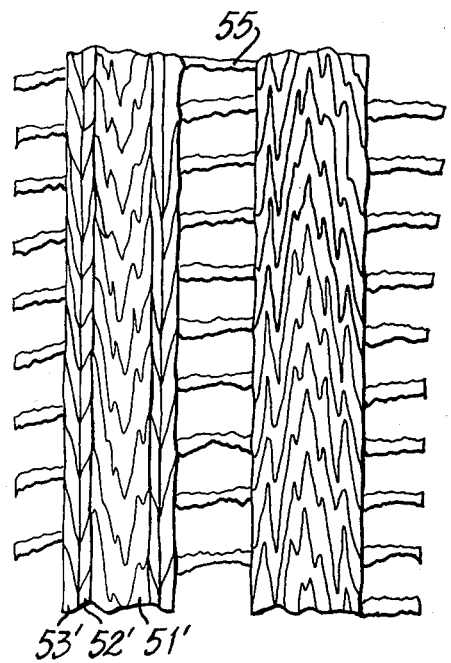
FIG. 5b is an illustration of the interference pattern of the glass fiber shown in FIG. 5a, FIG. 5c is a schematic diagram of the refractive-index distribution of the glass fiber shown in FIG. 5a, FIG. 5d is a diagram showing the absorption loss of the optical fiber produced in accordance with the present invention.
Figure 5C:
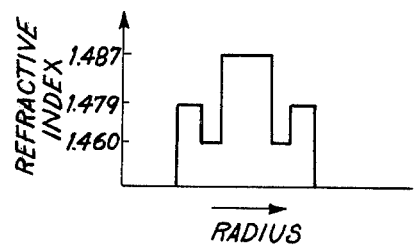
Figure 5D:
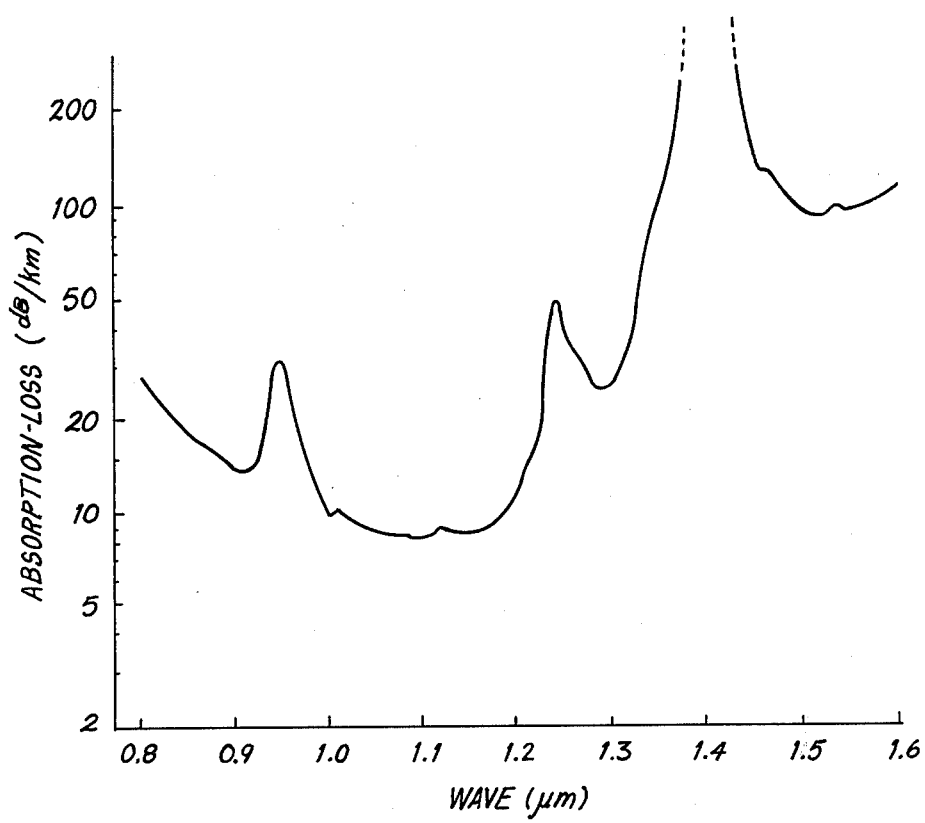

FIG. 5a shows the cross-section of the fiber produced in accordance with the present invention, FIG. 5b the pattern of the optical interference fringes of the film, FIG. 5c the radial refractive-index distribution function derived from the optical interference pattern shown in FIG. 5b and FIG. 5d the absorption loss characteristics of the optical waveguide.

We claim:

1. A method of producing an optical waveguide by melt-drawing a glass preform composite comprising a transparent glass rod having a core portion and a cladding portion and a high refractive index glass jacket for said transparent rod, which comprises the steps of (a) depositing a dopant material for raising the refractive index of glass on the internal surfaces of the pores of a porous glass rod; (b) forming a radial dopant concentration gradient decreasing from the central to the peripheral portions of said porous glass; (c) collapsing the doped rod by the application of heat to form said transparent glass rod having a core portion exhibiting a high index of refraction and an outer cladding exhibiting a low index of refraction; (d) providing said high index of refraction, circumferential jacket layer for said transparent rod of a glass matched to have a viscosity and coefficient of expansion at melt-drawing temperatures substantially similar to the viscosity of said core portion of said transparent rod and the index of refraction being higher than the cladding portion by inserting said rod into a pipe of said matched glass; (e) collapsing said pipe around said transparent rod by the application of heat to form said preform composite; and (f) melt-drawing and heat-treating said composite to form said optical waveguide having a smooth outer surface, moisture resistance and improved mechanical strength.

2. The method of claim 1, wherein said transparent glass rod is covered, on the periphery, by a jacket layer of borosilicate glass or alumina-silicate glass.

3. The method of producing optical waveguide in accordance with claim 1, wherein the rod is provided with a core portion and a cladding portion having high and low index of refraction respectively by means of stuffing and unstuffing processes in which a dopant is, respectively, deposited on or removed from the surface of the micro pores of porous glass, said rod being inserted into a borosilicate or alumina-silicate glass pipe which has higher index of refraction than the cladding and similar viscosity to the core portion, whereby the viscosity of the jacket portion made of said borosilicate or alumina-silicate glass is lower than the cladding portion, and finally, the melt-drawing process of the combination of said rod and pipe is carried out at a temperature at which the jacket glass is so soft as to make the surface of the fiber smooth.

4. The method of claim 2, wherein said transparent glass rod doped with dopant material is inserted in said pipe and the combination of the rod and pipe is simultaneously melt-drawn while the gap between said rod and pipe is being collapsed.

5. The method of claim 2, wherein said melt-drawing process is carried out after said transparent glass rod doped with a dopant material is inserted in said pipe and subsequently assembled into a single perform by collapsing the gap between said rod and said pipe.

* * * * *